(12) United States Patent
Lu et al.

(10) Patent No.: US 11,167,274 B2
(45) Date of Patent: Nov. 9, 2021

(54) IN—$NH_2$/G-$C_3N_4$ NANOCOMPOSITE WITH VISIBLE-LIGHT PHOTOCATALYTIC ACTIVITY AND PREPARATION AND APPLICATION THEREOF (71) Applicant: SOOCHOW UNIVERSITY, Suzhou (CN)

(72) Inventors: Jianmei Lu, Suzhou (CN); Qingfeng Xu, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 132 days.

(21) Appl. No.: 16/817,547

(22) Filed: Mar. 12, 2020

(65) Prior Publication Data
US 2020/0360905 A1 Nov. 19, 2020

(30) Foreign Application Priority Data
May 16, 2019 (CN) .......................... 201910411836.3

(51) Int. Cl.
*B01J 27/24* (2006.01)
*B01J 35/00* (2006.01)
*B01J 35/02* (2006.01)
*B01J 37/08* (2006.01)
(Continued)

(52) U.S. Cl.
CPC ............ *B01J 27/24* (2013.01); *B01J 35/004* (2013.01); *B01J 35/023* (2013.01); *B01J 37/08* (2013.01);
(Continued)

(58) Field of Classification Search
CPC .......... B01J 23/08; B01J 27/24; B01J 35/004; B01J 35/023; B01J 37/08; B01J 37/12;
(Continued)

(56) References Cited

U.S. PATENT DOCUMENTS

2018/0274013 A1* 9/2018 Zhang .................. C12Q 1/6825

FOREIGN PATENT DOCUMENTS

| CN | 10 3990486 | * | 8/2014 | ............. B01J 27/24 |
| CN | 10 8404959 | * | 8/2018 | ............. B01J 27/24 |

(Continued)

OTHER PUBLICATIONS

Chenmin Xu et al., "Fabrication of two-dimensional indium oxide nanosheets with graphitic carbon nitride nanosheets as sacrificial templates." Materials Letters 242, pp. 24-27. (Year: 2019).*

(Continued)

*Primary Examiner* — Patricia L. Hailey
(74) *Attorney, Agent, or Firm* — SZDC Law P.C.

(57) ABSTRACT

The present invention provides an In—$NH_2$/g-$C_3N_4$ nanocomposites with visible-light photocatalytic activity and application thereof, which can effectively remove organic pollutants (such as tetracycline) in water. First, the graphite phase carbonitride carbon (g-$C_3N_4$) was obtained by thermal condensation, and g-$C_3N_4$ nanosheet was prepared by thermal oxidative etching. Then, acicular MIL-68(In)—$NH_2$ (In—$NH_2$) was grown in situ on the surface of g-$C_3N_4$ nanosheet by solvothermal method. The In—$NH_2$/g-$C_3N_4$ nanocomposites with high visible-light photocatalytic activity were obtained. The CNNS firstly was prepared in the present invention, which is beneficial to the needle-like In—$NH_2$ growing on the surface of CNNS and having close interfacial contact with each other, forming a heterojunction, promoting the separation of photogenerated electrons and holes pairs, and enhancing visible-light photocatalytic degradation of organic pollutants. The nanocomposites show high structural stability and reusability, which has great potential in the field of water remediation.

10 Claims, 5 Drawing Sheets (51) Int. Cl.
  *B01J 37/12* (2006.01)
  *C02F 1/30* (2006.01)
  *B82Y 30/00* (2011.01)
  *B82Y 40/00* (2011.01)
  *C02F 101/34* (2006.01)

(52) U.S. Cl.
  CPC ............... *B01J 37/12* (2013.01); *C02F 1/30* (2013.01); *B82Y 30/00* (2013.01); *B82Y 40/00* (2013.01); *C02F 2101/345* (2013.01); *C02F 2305/10* (2013.01)

(58) Field of Classification Search
  CPC ......... B82Y 30/00; B82Y 40/00; C01B 21/06; C02F 1/30; C02F 2101/345; C02F 2305/10
  USPC ................................. 502/200; 423/364, 439
  See application file for complete search history.

(56) References Cited

FOREIGN PATENT DOCUMENTS

| | | | | |
|---|---|---|---|---|
| CN | 10 9876776 | * | 6/2019 | ............ B01J 20/22 |
| CN | 11 0841715 | * | 2/2020 | ............ B01J 31/16 |
| CN | 11 1097477 | * | 5/2020 | ............ B01J 27/24 |

OTHER PUBLICATIONS

Lei Wu et al., "Amino-modified MIL-68(In) with enhanced hydrogen and carbon dioxide sorption enthalpy." Microporous and Mesoporous Materials 157, pp. 75-81. (Year: 2012).*
Wen Cao et al., "In-situ fabrication of g-C3N4/MIL-68(In)-NH2 heterojunction composites with enhanced visible-light photocatalytic activity for degradation of ibuprofen." Chemical Engineering Journal 391, 123608, pp. 1-12. (Year: 2020).*

* cited by examiner

IN—NH$_2$/G-C$_3$N$_4$ NANOCOMPOSITE WITH VISIBLE-LIGHT PHOTOCATALYTIC ACTIVITY AND PREPARATION AND APPLICATION THEREOF

This application claims priority to Chinese Patent Application No.: 201910411836.3, filed on May 16, 2019, which is incorporated by reference for all purposes as if fully set forth herein.

FIELD OF THE INVENTION

The present invention belongs to the technical field of inorganic-organic nanocomposites and visible-light photocatalysis. Particularly, the present invention relates to the preparation of In—NH$_2$/g-C$_3$N$_4$ nanocomposites with visible-light photocatalytic activity and application thereof for effectively removal of organic pollutants in water.

BACKGROUND OF THE INVENTION

With the rapid development of industry, more and more wastewater has been generated, causing serious environmental problems. Industrial wastewater often contains organic compounds that are toxic and difficult to biodegrade directly. Organic pollutants mainly include organic dyes, phenols, biphenyls, pesticides, plasticizers, detergents, pharmaceuticals, etc. Among them, organic dyes have more than 100,000 dyes and produce more than 7,105 tons per year. These organic dyes are chemically stable and are not readily biodegradable in water, making them potentially hazardous to the environment. One of the biggest environmental problems of organic dyes is that they can absorb and reflect sunlight that shines into the water, interfering with the growth of bacteria to degrade the impurities in the water. Organic wastewater, which is highly toxic and difficult to degrade, has become one of the most serious global environmental problems today. Once organic pollutants were released into the aquatic ecosystem, which can cause various environmental problems, such as clogging sewage treatment plants, adversely affecting aquatic organisms, and increasing biochemical oxygen. Therefore, it is urgent to develop an efficient and economical technique to reduce the concentration of organic contaminants in wastewater.

Currently, industrially available wastewater treatment technologies, such as adsorption and condensation, only concentrate or separate these contaminants from water, but cannot be completely removed or decomposed into biodegradable or less toxic organic compounds, even innocuous $CO_2$, $H_2O$ or Inorganic salt. Other water treatment methods, such as chemical and membrane technologies, typically involve high operating costs and maybe generate secondary contaminants. Heterogeneous visible-light photocatalysis technology has attracted more and more attention in the field of degrading organic pollutants because of its catalyst recovery, high efficiency, sustainable (solar energy for sustainable clean energy) and no secondary pollution. At present, the most commonly used visible-light photocatalysts are single components, which have the disadvantages of narrow range of visible-light absorption, easy recombination of photogenerated electrons and holes pairs, and low transmission rate of pollutants. Nanocomposites can fully avoid these shortcomings of single-component photocatalysts; however, existing nanocomposites have the disadvantages of small specific surface area and inaccurate interfacial contact.

OBJECTIVE OF THE INVENTION

The main objective of present invention, aimed at the deficiencies of the prior art, is to provide the preparation method of In—NH$_2$/g-C$_3$N$_4$ nanocomposites and its application for visible-light photocatalytic degradation of organic pollutants. The nanocomposites in the present invention is one of the novel organic-inorganic hybridization photocatalysts, and possessing the advantages of simple preparation method, high specific surface area, close interface contact and effective separation of photogenerated electrons and hole pairs.

DETAILED DESCRIPTION OF THE INVENTION

The preparation process of In—NH$_2$/g-C$_3$N$_4$ nanocomposites with visible-light photocatalytic activity, comprises the following steps: thermal oxidation etching of bulk g-C$_3$N$_4$ in air to obtain g-C$_3$N$_4$ nanosheet; and then In—NH$_2$/g-C$_3$N$_4$ nanocomposites were obtained by in situ growth of acicular In—NH$_2$ on the surface of g-C$_3$N$_4$ nanosheet by solvothermal method.

The present invention discloses a method for removing organic pollutants in water, comprising the following steps:

(1) The g-C$_3$N$_4$ nanosheet was obtained by thermally oxidation of the bulk g-C$_3$N$_4$ in air; then the In—NH$_2$/g-C$_3$N$_4$ composite was obtained by in-situ growth of needle-like In—NH$_2$ on the surface of g-C$_3$N$_4$ nanosheet by solvothermal method;

(2) Dissolving the indium salt in a solvent, adding a compound containing an amino group, and then reacting at 80 to 150° C. for 2 to 10 hours to obtain needle-like In—NH$_2$;

(3) Then, the In—NH$_2$/g-C$_3$N$_4$ nanocomposite or needle-shaped In—NH$_2$ are add into water containing organic pollutants, and to visible-light photocatalytic degradation of organic pollutants under stirring.

In the present invention, the temperature, time and temperature rising rate of the thermal oxidation etching was 300 to 500° C., 2 to 5 hours and 2 to 10° C./min, respectively.

In the present invention, the bulk g-C$_3$N$_4$ was prepared by calcining urea at 550° C. for 4 hours in air, then cooling to room temperature, and grinding the product to obtain a bulk g-C$_3$N$_4$.

In the present invention, the in-situ growth of acicular In—NH$_2$ on the surface of g-C$_3$N$_4$ nanosheet by solvothermal method is as follows: dispersing the g-C$_3$N$_4$ nanosheet in a solvent, then adding an indium salt, adding a compound containing an amino group, and then the reaction was carried out at 80 to 150° C. for 2 to 10 hours. Preferably, the g-C$_3$N$_4$ nanosheet was dispersed in a solvent, and after 30 minutes of sonication, the indium salt was added, and the mixture was stirred for 60 minutes and then the compound containing an amino group was added.

The invention also discloses a needle-shaped In—NH$_2$ prepared by dissolving an indium salt in a solvent, adding a compound containing an amino group, and then reacting at 80 to 150° C. for 2 to 10 hours to obtain a needle-like In—NH$_2$.

In the present invention, the molar ratio of the indium salt to the a compound containing an amino group was 1:(0.1 to 0.5); the mass ratio of the g-C$_3$N$_4$ nanosheet to the indium salt was 1:(10 to 15); the solvent is dimethyl sulfoxide, N,N-dimethylformamide or N,N-dimethylacetamide; the indium salt is indium nitrate or indium trichloride; and the compound containing an amino group was 2-aminoterephthalic acid.

In the present invention, when the solvothermal reaction was completed, the mixture was centrifuged, and the obtained solid was washed with N,N-dimethylformamide and absolute ethanol, respectively, and then vacuum dried to obtain In—$NH_2$/g-$C_3N_4$ nanocomposite.

The invention also discloses the application of the above In—$NH_2$/g-$C_3N_4$ nanocomposites or needle-shaped In—$NH_2$ in visible-light photocatalytic degradation of organic pollutants in water.

In the present invention, the In—$NH_2$/g-$C_3N_4$ nanocomposites or the needle-shaped In—$NH_2$ was added to the water containing the organic pollutants, and the mixture was stirred to complete the removal of the organic pollutants in the water; and the mixture was first stirred in the dark, and then irradiated in the visible light.

In the present invention, the organic pollutant was tetracycline.

The present invention provides a method for preparing In—$NH_2$/g-$C_3N_4$ nanocomposites with visible-light photocatalytic activity or needle-shaped In—$NH_2$, which can be the following specific steps:

(1) Synthesis of g-$C_3N_4$ Nanosheet

The g-$C_3N_4$ nanosheet was prepared by a process of thermal condensation and oxidative etching. 30 g of urea was added to the alumina crucible with covered, and placed in a tube furnace, and the tube furnace was heated to 550° C. in air at a heating rate of 2.5° C./min for 4 hours; then cooled to room temperature. The obtained yellow product was ground into a powder (bulk g-$C_3N_4$) and then placed in an open crucible, heated to 300-500° C. at a temperature increase rate of 2-10° C./min, kept for 2-5 hours, and then cooled to room temperature. The obtained g-$C_3N_4$ nanosheet was washed several times with deionized water and dried in a vacuum oven at 100° C. for 12 hours.

(2) Synthesis of Needle-Shaped In—$NH_2$ 0.5-2 mmol of indium salt and 0.2-1 mmol of 2-aminoterephthalic acid were dissolved in 10 mL of solvent at room temperature. After stirring for 1 hour, the above mixture was transferred to a 25 mL tetrafluoroethylene inner liner, sealed in a stainless steel autoclave, and reacted at 80-150° C. for 2-10 hours. After cooling to room temperature, the product was washed three times with N,N-dimethylformamide and absolute ethanol, and centrifuged, and dried in a vacuum oven at 100° C. for 12 hours to give a pale yellow powder.

(3) Synthesis of In—$NH_2$/g-$C_3N_4$ Nanocomposites 25-100 mg of g-$C_3N_4$ nanosheet powder was ultrasonically dispersed in 10 mL of solvent. After 30 minutes of sonication, 0.5-2 mmol of indium salt was added. After stirring for 60 minutes, 0.2-1 mmol of 2-aminoterephthalic acid was added and stirred for another 30 minutes. Thereafter, the mixture was transferred to a 25 mL tetrafluoroethylene liner, sealed in a stainless steel autoclave, and reacted at 80-150° C. for 2-10 hours. The product was collected by centrifugation and washed several times with N,N-dimethylformamide and absolute ethanol. The final product was placed in a vacuum oven and dried at 100° C. for 12 hours.

The beneficial effects of present invention: the In—$NH_2$/g-$C_3N_4$ nanocomposites with visible-light photocatalytic activity, as a photocatalyst, has a large specific surface area, a close interface contact between the needle-like In—$NH_2$ and g-$C_3N_4$ nanosheet, which is easy to form heterojunction, help to separate electrons and holes, and can effectively decompose organic pollutants in water. Moreover, the nanocomposites are easy to separate and recyclable, and not cause secondary pollution to the environment; The raw materials of the prepared In—$NH_2$/g-$C_3N_4$ nanocomposite are cheap and easy to obtain, the synthesis process of materials is simple, the cost is low, and the industrial application potential is great.

EXAMPLES

Examples are given by way of illustration and therefore should not be construed to limit the scope of the invention.

Example 1

Synthesis of g-$C_3N_4$ Nanosheet

Figure 1:
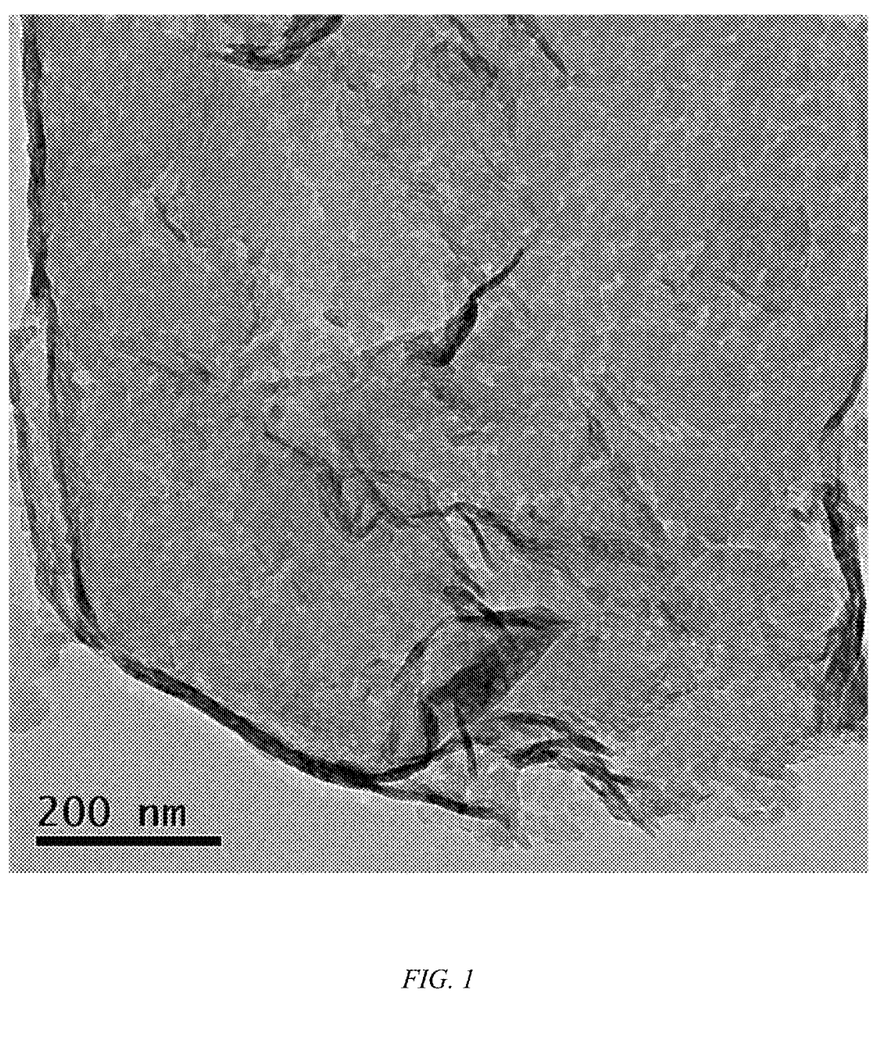
FIG. 1 is a transmission electron micrograph image of g-$C_3N_4$ nanosheet in the example 1.

The g-$C_3N_4$ nanosheet was prepared by a process of thermal condensation and oxidative etching. 30 g of urea was added to the alumina crucible, capped, and placed in a tube furnace. The tube furnace was heated to 550° C. at a rate of 2.5° C./min in air and calcined for 4 hours. After cooling to room temperature, the obtained yellow product was ground into a powder and placed in an open crucible, and heated at 500° C. at a rate of 2.5° C./min for 2 hours. Thereafter, the obtained g-$C_3N_4$ nanosheet was washed several times with deionized water and dried in a vacuum oven at 100° C. for 12 hours. As can be seen from FIG. 1, the as-synthesized g-$C_3N_4$ nanosheet is a lamellar material.

Example 2

Figure 2:
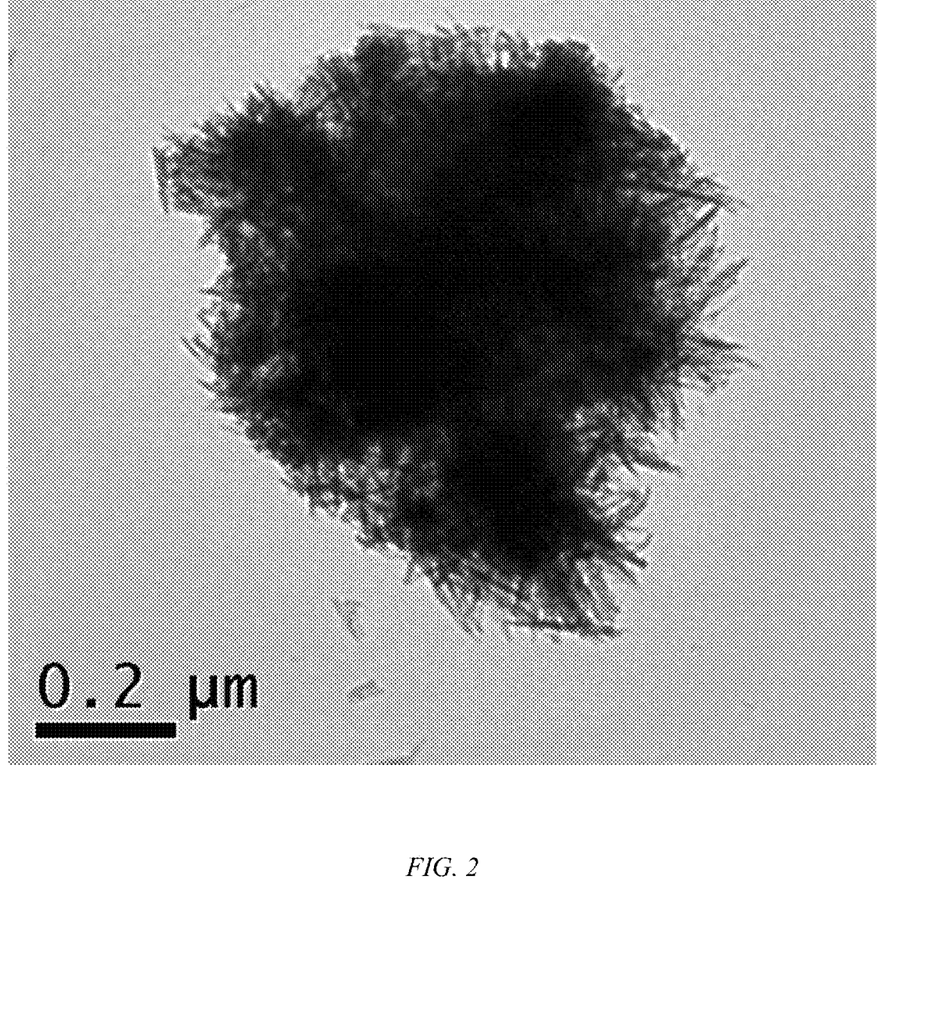
FIG. 2 is a transmission electron micrograph image of needle-like In—$NH_2$ in the example 2.

Synthesis of Needle-Shaped In—$NH_2$ 1.5 mmol of indium nitrate and 0.5 mmol of 2-aminoterephthalic acid were dissolved in 10 mL of N,N-dimethylformamide with sonication at room temperature. After stirring for 1 hour, the above mixture was transferred to a 25 mL tetrafluoroethylene inner liner, sealed in a stainless steel autoclave, and reacted at 150° C. for 10 hours. After cooling to room temperature, the product was washed three times with N,N-dimethylformamide and absolute ethanol, respectively. Then, the suspension was centrifuged, and dried in a vacuum oven at 100° C. for 12 hours to give a pale yellow powder. As can be seen from FIG. 2, the as-synthesized In—$NH_2$ is a needle-like material.

Example 3

Synthesis of In—$NH_2$/g-$C_3N_4$ Nanocomposites

Figure 3:
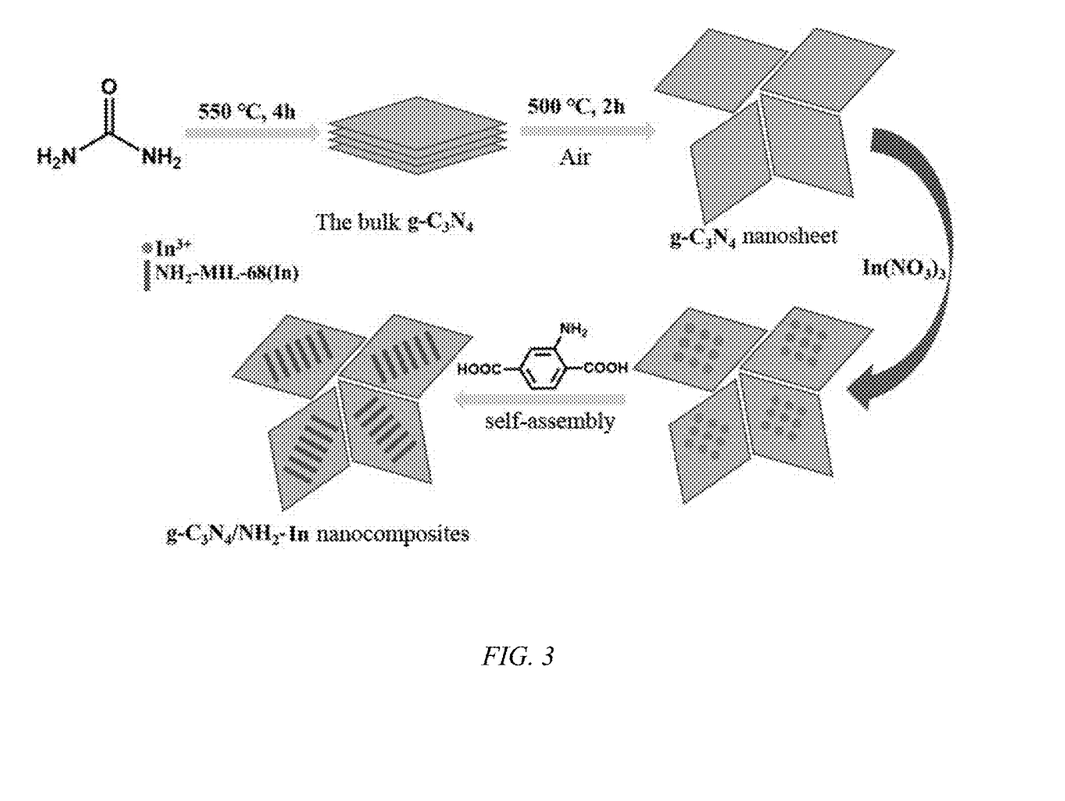
FIG. 3 is a flow chart for the preparing process of as-synthesized In—$NH_2$/g-$C_3N_4$ nanocomposites in the example 3.
Figure 4:
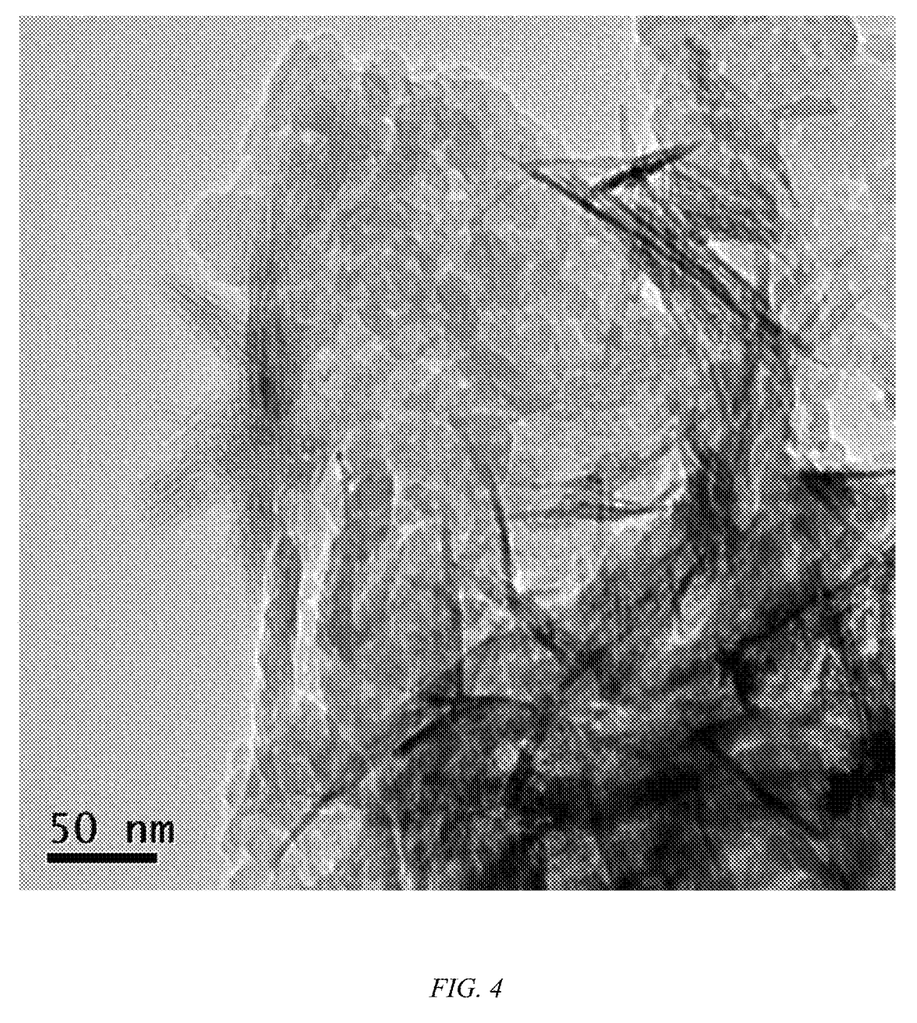
FIG. 4 is a transmission electron micrograph image of as-synthesized In—$NH_2$/g-$C_3N_4$ in the example 3.
Figure 5:
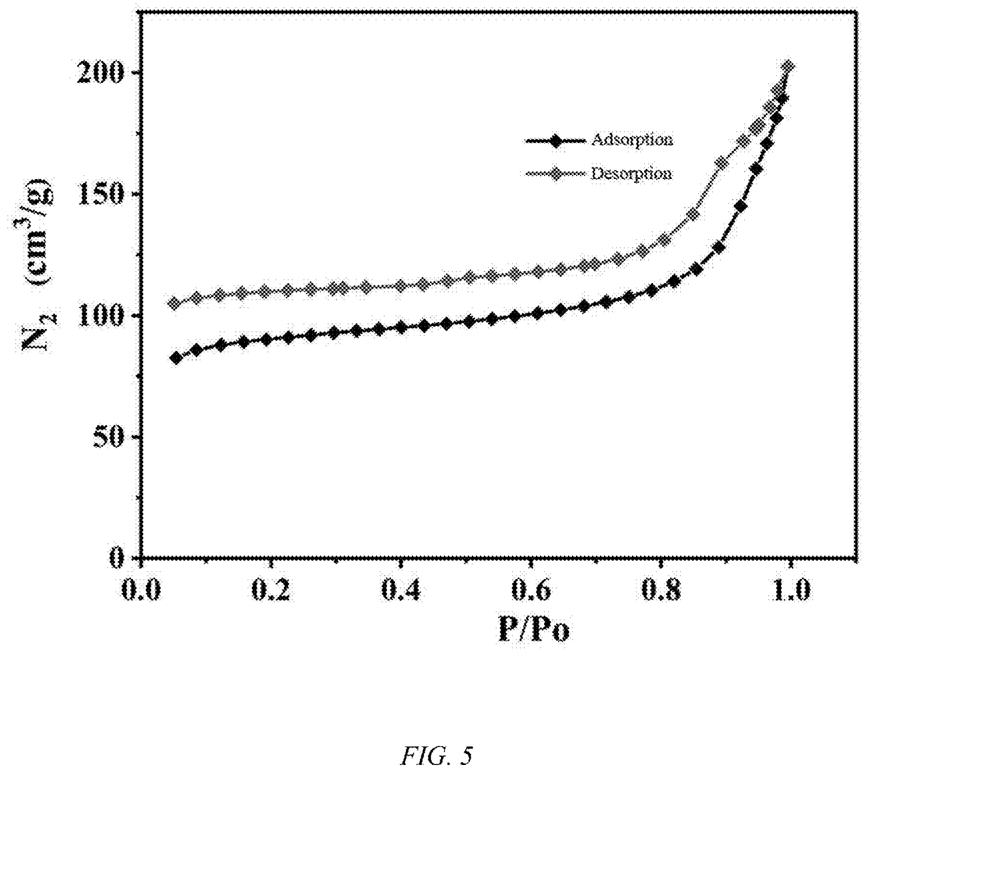
FIG. 5 is $N_2$ adsorption-desorption isotherm of as-synthesized In—$NH_2$/g-$C_3N_4$ in the example 3.

The synthetic route of In—$NH_2$/g-$C_3N_4$ is shown in FIG. 3. 50 mg of g-$C_3N_4$ nanosheet (Example 1) was ultrasonically dispersed in 10 mL of N,N-dimethylformamide. After 30 minutes of sonication, 1.5 mmol of indium nitrate was added. After stirring for 60 minutes, 0.5 mmol of 2-aminoterephthalic acid was added and stirred for 30 minutes. Thereafter, the mixture was transferred to a 25 mL tetrafluoroethylene liner, sealed in a stainless steel autoclave, and reacted at 125° C. for 5 hours. The product was collected by centrifugation and washed several times with N,N-dimethylformamide and absolute ethanol, respectively. The final product was placed in a vacuum oven and dried at 100° C. for 12 hours. As can be seen from FIG. 4, the needle-like In—$NH_2$ grows in situ on the surface of the g-$C_3N_4$ nanosheet with close interfacial contact with each other. The nitrogen adsorption-desorption isotherm of In—$NH_2$/g-$C_3N_4$ is shown in FIG. 5, and is classified as a type I isotherm based on the International Union of Pure and Applied Chemistry (IUPAC). The material was mainly micropores with a specific surface area of 281 $m^2$ $g^{-1}$, the average pore size was 5.359 nm, and the total pore volume was 0.313 $cm^3$ $g^{-1}$.

Example 4

Synthesis of In—$NH_2$/g-$C_3N_4$ Nanocomposites 25 mg of g-$C_3N_4$ nanosheet (Example 1) was ultrasonically dispersed in 10 mL of N,N-dimethylformamide. After 30 minutes of sonication, 1.5 mmol of indium nitrate was added. After stirring for 60 minutes, 0.5 mmol of 2-aminoterephthalic acid was added and stirred for 30 minutes. Thereafter, the mixture was transferred to a 25 mL tetrafluoroethylene liner, sealed in a stainless steel autoclave, and reacted at 125° C. for 5 hours. The product was collected by centrifugation and washed several times with N,N-dimethylformamide and absolute ethanol. The final product was placed in a vacuum oven and dried at 100° C. for 12 hours.

Example 5

Synthesis of In—$NH_2$/g-$C_3N_4$ Nanocomposites 100 mg of g-$C_3N_4$ nanosheet (Example 1) was ultrasonically dispersed in 10 mL of N,N-dimethylformamide. After 30 minutes of sonication, 1.5 mmol of indium nitrate was added. After stirring for 60 minutes, 0.5 mmol of 2-aminoterephthalic acid was added and stirred for 30 minutes. Thereafter, the mixture was transferred to a 25 mL tetrafluoroethylene liner, sealed in a stainless steel autoclave, and reacted at 125° C. for 5 hours. The product was collected by centrifugation and washed several times with N,N-dimethylformamide and absolute ethanol. The final product was placed in a vacuum oven and dried at 100° C. for 12 hours.

Example 6

Experiment of Visible-Light Photocatalytic Degradation of Tetracycline Over g-$C_3N_4$ Nanosheet The photoreactor is a PCX50A Discover multi-channel photocatalytic reaction system (Beijing Perfectlight Science and Technology Co., Ltd.), and LED lamps (420≤λ≤800 nm, 5 W, ≈50 mW/$cm^2$) were used as visible-light sources. 50 mL of 50 mg/L aqueous solution of tetracycline was added to a 60 mL cylindrical quartz tube, and 25 mg of the photocatalyst g-$C_3N_4$ nanosheet obtained in the above Example 1 was dispersed therein, and magnetically stirred (500 rpm). Prior to irradiation, the suspension was kept in the dark for 1 hour to achieve an adsorption-desorption equilibrium where the tetracycline removal rate was about 3%. Then, turn on the LED light. Next, 3 mL of the sample was withdrawn at regular intervals (30 min) and filtered through a 0.22 μm syringe filter to remove the solid catalyst. Finally, the concentration of remaining tetracycline after degradation was measured by a UV-vis spectrometer with a maximum absorption wavelength of 357 nm. After 150 minutes of illumination, the tetracycline removal rate was 30%.

Example 7

Experiment of Visible-Light Photocatalytic Degradation of Tetracycline Over In—$NH_2$ 50 mL of 50 mg/L aqueous solution of tetracycline was added to a 60 mL cylindrical quartz tube, and 25 mg of the photocatalyst In—$NH_2$ obtained in the above Example 2 was dispersed therein, and magnetically stirred (500 rpm). Prior to irradiation, the suspension was kept in the dark for 1 hour to achieve an adsorption-desorption equilibrium where the tetracycline removal rate was about 29%. Then, turn on the LED light. Next, 3 mL of the sample was withdrawn at regular intervals (30 min) and filtered through a 0.22 μm syringe filter to remove the solid catalyst. Finally, the concentration of remaining tetracycline after degradation was measured by a UV-vis spectrometer with a maximum absorption wavelength of 357 nm. After 150 minutes of illumination, the tetracycline removal rate was 58%.

Example 8

Experiment of Visible-Light Photocatalytic Degradation of Tetracycline Over In—$NH_2$/g-$C_3N_4$ 50 mL of 50 mg/L aqueous solution of tetracycline was added to a 60 mL cylindrical quartz tube, and 25 mg of the photocatalyst In—$NH_2$/g-$C_3N_4$ obtained in the above Example 3 was dispersed therein, and magnetically stirred (500 rpm). Prior to irradiation, the suspension was kept in the dark for 1 hour to achieve an adsorption-desorption equilibrium where the tetracycline removal rate was about 43%. Then, turn on the LED light. Next, 3 mL of the sample was withdrawn at regular intervals (30 min) and filtered through a 0.22 μm syringe filter to remove the solid catalyst. Finally, the concentration of remaining tetracycline after degradation was measured by a UV-vis spectrometer with a maximum absorption wavelength of 357 nm. After 150 minutes of illumination, the tetracycline removal rate was 71%.

Example 9

Experiment of Visible-Light Photocatalytic Degradation of Tetracycline Over In—$NH_2$/g-$C_3N_4$ 50 mL of 50 mg/L aqueous solution of tetracycline was added to a 60 mL cylindrical quartz tube, and 25 mg of the photocatalyst In—$NH_2$/g-$C_3N_4$ obtained in the above Example 4 was dispersed therein, and magnetically stirred (500 rpm). Prior to irradiation, the suspension was kept in the dark for 1 hour to achieve an adsorption-desorption equilibrium where the tetracycline removal rate was about 38%. Then, turn on the LED light. Next, 3 mL of the sample was withdrawn at regular intervals (30 min) and filtered through a 0.22 μm syringe filter to remove the solid catalyst. Finally, the concentration of remaining tetracycline after degradation was measured by a UV-vis spectrometer with a maximum absorption wavelength of 357 nm. After 150 minutes of illumination, the tetracycline removal rate was 61%.

Example 10

Experiment of Visible-Light Photocatalytic Degradation of Tetracycline Over In—NH$_2$/g-C$_3$N$_4$ 50 mL of 50 mg/L aqueous solution of tetracycline was added to a 60 mL cylindrical quartz tube, and 25 mg of the photocatalyst In—NH$_2$/g-C$_3$N$_4$ obtained in the above Example 5 was dispersed therein, and magnetically stirred (500 rpm). Prior to irradiation, the suspension was kept in the dark for 1 hour to achieve an adsorption-desorption equilibrium where the tetracycline removal rate was about 39%. Then, turn on the LED light. Next, 3 mL of the sample was withdrawn at regular intervals (30 min) and filtered through a 0.22 μm syringe filter to remove the solid catalyst. Finally, the concentration of remaining tetracycline after degradation was measured by a UV-vis spectrometer with a maximum absorption wavelength of 357 nm. After 150 minutes of illumination, the tetracycline removal rate was 63%.

Example 11

Cyclic Experiment of Visible-Light Photocatalytic Degradation of Tetracycline Over In—NH$_2$/g-C$_3$N$_4$ The In—NH$_2$/g-C$_3$N$_4$ composite material recovered after 150 minutes of illumination in the above Example 8 was washed successively with deionized water and absolute ethanol, dried, placed in a fresh 50 mL 50 mg/L tetracycline solution. The mixture was illuminated with LED lamp for 150 minutes. Next, 3 mL of the sample was withdrawn at regular intervals (30 min) and filtered through a 0.22 μm syringe filter to remove the solid catalyst. The concentration of remaining TC after degradation was measured by a UV-vis spectrometer with a maximum absorption wavelength of 357 nm. This process was repeated three times, and the In—NH$_2$/g-C$_3$N$_4$ composite material always maintained good photocatalytic performance. After irradiation for 150 minutes, the removal efficiency of tetracycline in the aqueous solution was 71%, 70%, and 70%, respectively.

The invention claimed is:

1. A method of preparing In—NH$_2$/g-C$_3$N$_4$ nanocomposites with visible-light photocatalytic activity comprises the following steps:

obtaining a g-C$_3$N$_4$ nanosheet by oxidation etching of a g-C$_3$N$_4$ powder in air; and obtaining the In—NH$_2$/g-C$_3$N$_4$ nanocomposites by in-situ growth of In—NH$_2$ on the surface of the g-C$_3$N$_4$ nanosheet by a solvothermal method.

2. The method according to claim 1, wherein the temperature of the oxidation etching is 300 to 500° C. and the time of oxidation etching is 2 to 5 hours, and the temperature rising rate of the oxidation etching is 2 to 10° C./min.

3. The method according to claim 1, wherein the g-C$_3$N$_4$ nanosheet is dispersed in a solvent, an indium salt is added, an amino compound is added, a reaction is carried out at 80 to 150° C. for 2 to 10 hours, and the In—NH$_2$ is grown in situ on the surface of the g-C$_3$N$_4$ nanosheet.

4. The method according to claim 3, wherein the molar ratio of the indium salt to the amino compound is 1:(0.1 to 0.5); the mass ratio of the g-C$_3$N$_4$ nanosheet to the indium salt is 1:(10 to 15).

5. The method according to claim 3, wherein the solvent is dimethyl sulfoxide, N, N-dimethylformamide or N, N-dimethyl acetamide; the indium salt is indium nitrate or indium trichloride.

6. The method according to claim 1, further comprising:

calcining urea at 550° C. for 4 hours in air, cooling to room temperature, and grounding to obtain the g-C$_3$N$_4$ powder.

7. A method for preparing In—NH$_2$, comprising:

dissolving an indium salt in a solvent, adding an amino compound, and then reacting at 80 to 150° C. for 2 to 10 hours, and finally, obtaining the In—NH$_2$.

8. The method according to claim 7, wherein a molar ratio of the indium salt to the amino compound is 1:(0.1 to 0.5); and the solvent is dimethyl sulfoxide, N, N-dimethylformamide or N, N-dimethylacetamide; the indium salt is indium nitrate or indium trichloride.

9. The In—NH$_2$/g-C$_3$N$_4$ nanocomposites with visible-light photocatalytic activity prepared according to claim 1 and used for photocatalytic degradation of organic pollutants in water.

10. The In—NH$_2$ prepared according to claim 7 and used for photocatalytic degradation of organic pollutants in water.

* * * * *